(12) United States Patent
Hirata (10) Patent No.: US 8,804,271 B2
(45) Date of Patent: Aug. 12, 2014

(54) INFORMATION PROCESSING APPARATUS AND HEAD EVACUATION PROCESSING METHOD THEREFOR

(75) Inventor: Kazushige Hirata, Nagano (JP)

(73) Assignee: Sony Corporation, Tokyo (JP)

( * ) Notice: Subject to any disclaimer, the term of this patent is extended or adjusted under 35 U.S.C. 154(b) by 425 days.

(21) Appl. No.: 13/074,486

(22) Filed: Mar. 29, 2011

(65) Prior Publication Data

US 2011/0261482 A1    Oct. 27, 2011

(30) Foreign Application Priority Data

Apr. 27, 2010    (JP) .................................. 2010-102034

(51) Int. Cl.
*G11B 21/02*    (2006.01)
*G11B 15/48*    (2006.01)
*G11B 19/04*    (2006.01)
*G11B 21/12*    (2006.01)

(52) U.S. Cl.
CPC .............. *G11B 19/043* (2013.01); *G11B 21/12* (2013.01); *G11B 19/042* (2013.01)
USPC .......................................... 360/75; 360/74.1

(58) Field of Classification Search
None
See application file for complete search history.

(56) References Cited

U.S. PATENT DOCUMENTS

| 5,227,929 | A  | * | 7/1993  | Comerford ..................... 360/75 |
| 5,982,573 | A  | * | 11/1999 | Henze ............................. 360/75 |
| 7,301,723 | B2 | * | 11/2007 | Matsumoto ..................... 360/75 |
| 7,382,567 | B2 | * | 6/2008  | Liao et al. ....................... 360/75 |
| 7,430,452 | B2 | * | 9/2008  | Cromer et al. ................. 700/79 |
| 7,450,332 | B2 | * | 11/2008 | Pasolini et al. ................. 360/75 |
| 7,549,335 | B2 | * | 6/2009  | Inoue et al. .................... 73/510 |
| 8,164,847 | B2 | * | 4/2012  | Shibata .......................... 360/75 |
| 2005/0270700 | A1 | | 12/2005 | Matsumoto |
| 2007/0177295 | A1 | | 8/2007  | Miyoshi et al. |

FOREIGN PATENT DOCUMENTS

JP    2005-346840    12/2005
JP    2007-179673    7/2007

* cited by examiner

*Primary Examiner* — K. Wong
(74) *Attorney, Agent, or Firm* — Oblon, Spivak, McClelland, Maier & Neustadt, L.L.P.

(57) ABSTRACT

An information processing apparatus includes a hard disk drive, an acceleration detection portion, and a controller. The hard disk drive has a protective function for moving a head from a recording area of a disk to an evacuation position. The acceleration detection portion is configured to detect, as a detection target acceleration, an acceleration in one of a vertical direction and an almost-vertical direction with respect to a gravity direction. The controller is configured to detect a movement based on the acceleration detected as the detection target acceleration and determine whether to activate the protective function of the hard disk drive based on the detected movement.

14 Claims, 11 Drawing Sheets

INFORMATION PROCESSING APPARATUS AND HEAD EVACUATION PROCESSING METHOD THEREFOR

BACKGROUND OF THE INVENTION

1. Field of the Invention

The present invention relates to an information processing apparatus such as a personal computer that has a built-in HDD (Hard Disk Drive) and a head evacuation processing method for the built-in hard disk drive.

2. Description of the Related Art

Information processing apparatuses such as a portable personal computer use an HDD (Hard Disk Drive) as a data storage apparatus in many cases. In the HDD, since a head slightly floats from a surface of a disk due to an airflow caused by a disk rotation, when a large acceleration caused by an impact is applied, there is a possibility that the head would be brought into contact with a disk recording surface depending on the magnitude of the acceleration to thus break the disk. For such a reason, the HDD is normally equipped with a protective function for preventing, by moving the head from a disk recording area to an evacuation position at a time an impact is applied, the head and the disk recording surface from coming into contact with each other and the disk from breaking.

In many cases, an acceleration sensor, particularly a triaxial acceleration sensor that is capable of detecting accelerations in triaxial directions at the same time, is used for detecting an impact. As an example of a system that performs head evacuation processing using such a triaxial acceleration sensor, there are known a system that performs head evacuation processing when any of the accelerations in the triaxial directions detected by the triaxial acceleration sensor exceeds a preset threshold value and a system that executes the head evacuation processing once a drop (gravity-free state) is detected based on the acceleration values in the triaxial directions (see, for example, Japanese Patent Application Laid-open No. 2005-346840).

SUMMARY OF THE INVENTION

In those systems, however, it is actually difficult to move the head to the evacuation position before a timing at which an acceleration is applied to the HDD by an impact/shake. In this regard, a system that executes a head evacuation operation by detecting a movement before a shake/impact is applied to the information processing apparatus based on the accelerations in the triaxial directions is being developed. However, this system reacts to a different movement that normally does not require the head evacuation operation and assumes it as a movement before a shake/impact is applied to the information processing apparatus.

For example, since relatively-large accelerations are generated in a thickness direction (Z-axis direction) when a key is consecutively pushed while a portable (laptop) information processing apparatus is being held, the movement may be misrecognized as a movement before a shake/impact is applied to the information processing apparatus and an unnecessary head evacuation operation may thus be caused. Moreover, since the HDD becomes inaccessible for a certain time period once the head evacuation operation is caused while the information processing apparatus is being used as described above, operability for users is impaired. Further, since relatively-large accelerations in a vertical direction are generated consecutively when the information processing apparatus is being carried in an arm of a user, it is highly likely that an unnecessary head evacuation operation is also caused in this case. Furthermore, it is not easy to cope with such a problem by optimizing a threshold value of the accelerations in the axial directions (sensitivity adjustment). Specifically, this is because it is difficult to find a definite boundary between a range of accelerations that are detected as a movement before a shake/impact is applied to the information processing apparatus and a range of accelerations that are detected when a key is consecutively pushed or when the user is carrying the information processing apparatus.

In view of the circumstances as described above, there is a need for an information processing apparatus that is capable of activating a protective function of a hard disk drive at an optimal timing and improving stability in protecting the hard disk drive and operability for a user, and a head evacuation processing method for the information processing apparatus.

According to an embodiment of the present invention, there is provided an information processing apparatus including: a hard disk drive that has a protective function for moving a head from a recording area of a disk to an evacuation position; an acceleration detection portion configured to detect, as a detection target acceleration, an acceleration in one of a vertical direction and an almost-vertical direction with respect to a gravity direction; and a controller configured to detect a movement based on the acceleration detected as the detection target acceleration and determine whether to activate the protective function of the hard disk drive based on the detected movement.

In the embodiment of the present invention, the controller detects the movement based on the acceleration in the vertical direction or the almost-vertical direction with respect to the gravity direction and determines whether to activate the protective function of the hard disk drive based on the detected movement. With this structure, it becomes possible to prevent an unnecessary head evacuation operation from being executed due to an increase of an acceleration in a direction parallel to the gravity direction at a time the user operates the keys while holding the information processing apparatus in hand or when the user is carrying the information processing apparatus in the arm.

Further, according to this embodiment, the controller is capable of detecting, based on the acceleration value in the axial direction that is closest to the direction vertical to the gravity direction, a movement at a time the information processing apparatus is about to be put on a table from a state where it is carried in the arm of the user, and activate the protective function of the hard disk drive. Specifically, the controller is capable of detecting a fact that a shake/impact of a dangerous level is about to be applied to the information processing apparatus at an earliest time possible out of the movements of the information processing apparatus before the application, to thus start the head evacuation processing. As a result, it becomes possible to raise the possibility that the head evacuation is ended at a time point a shake/impact of a dangerous level is actually applied to the information processing apparatus and enhance protection performance of the hard disk drive.

Here, since the acceleration in the vertical direction or the almost-vertical direction with respect to the gravity direction is generated also when the information processing apparatus is being carried, the controller judges whether the movement is a movement that is detected at the time the information processing apparatus is being carried or the movement is a movement before a shake/impact of a dangerous level is applied to the information processing apparatus. This point can be dealt with by the controller setting, regarding the acceleration in the vertical direction or the almost-vertical direction with respect to the gravity direction, a fact that an acceleration larger than a preset threshold value has continued for over a preset time as a condition of the movement for determining whether to activate the protective function of the hard disk drive. At this time, the threshold value of the acceleration is set to be larger than an acceleration corresponding to a movement of an arm of a user that is caused when the information processing apparatus is being carried in the arm of the user.

The acceleration detection portion may be capable of detecting accelerations in triaxial directions orthogonal to one another and detect an acceleration in the axial direction closest to the direction vertical to the gravity direction out of the biaxial directions among the triaxial directions as the detection target acceleration.

The acceleration detection portion may be capable of detecting accelerations in triaxial directions orthogonal to one another and detect an acceleration component vertical to the gravity direction out of the biaxial directions among the triaxial directions as the detection target acceleration.

The information processing apparatus may further include a storage portion configured to store a result of the judgment on the axial direction obtained by the acceleration detection portion as an axial direction in which an acceleration is to be detected at least as the next detection target acceleration, and the controller may detect, regarding the axial direction stored by the storage portion, the movement based on the acceleration detected by the acceleration detection portion.

The hard disk drive may include the disk and a disk drive portion for driving the disk, and the controller may output a control signal for putting a brake on the disk drive portion after activating the protective function.

When activating the protective function of the hard disk drive, the controller decelerates or stops the drive of the disk as quickly as possible by outputting a control signal so as to put a brake on the disk drive portion. As a result, a breakage degree can be suppressed even when the head is too late to evacuate at a timing at which a shake/impact is applied and the head comes into contact with the data recording surface.

According to another embodiment of the present invention, there is provided a head evacuation processing method for an information processing apparatus including a built-in hard disk drive that has a protective function for moving a head from a recording area of a disk to an evacuation position, the head evacuation processing method including: detecting, as a detection target acceleration, an acceleration in one of a vertical direction and an almost-vertical direction with respect to a gravity direction; and detecting a movement based on the acceleration detected as the detection target acceleration and determining whether to activate the protective function of the hard disk drive based on the detected movement.

According to the embodiments of the present invention, it is possible to activate the protective function of the hard disk drive at a more-optimal timing, improve stability in protecting the hard disk drive, and improve operability for a user.

These and other objects, features and advantages of the present invention will become more apparent in light of the following detailed description of best mode embodiments thereof, as illustrated in the accompanying drawings.

DESCRIPTION OF PREFERRED EMBODIMENTS

Hereinafter, embodiments of the present invention will be described with reference to the drawings.

First Embodiment

Structure of Information Processing Apparatus

Figure 1:
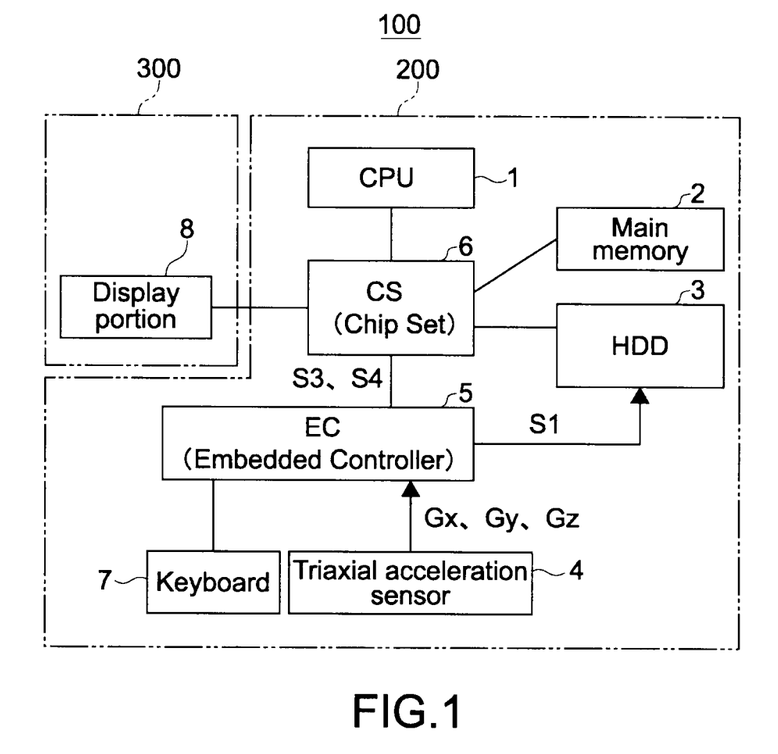
FIG. 1 is a block diagram showing a structure of an information processing apparatus according to a first embodiment of the present invention.

FIG. 1 is a block diagram showing a structure of an information processing apparatus according to a first embodiment of the present invention.

An information processing apparatus 100 includes a main body portion 200 and a display portion 300. The main body portion 200 includes a CPU (Central Processing Unit) 1, a main memory 2, an HDD (Hard Disk Drive) 3, a triaxial acceleration sensor 4, an EC (Embedded Controller) 5, a CS (Chip Set) 6, and a keyboard 7. The display portion 300 includes a display portion 8 constituted of an LCD (Liquid Crystal Display) and the like.

The CPU 1 performs various operational processing for executing an OS (Operating System) stored in the main memory 2, application programs that are run on the OS, and the like. The HDD 3 is used as an external storage apparatus of the information processing apparatus 100.

The CS 6 is a circuit that controls a circulation of information among devices such as the CPU 1, the main memory 2, the HDD 3, the EC 5, and the display portion 8. The display portion 8 is a device that displays information to a user. The keyboard 7 is a device that processes inputs from the user.

Figure 2:
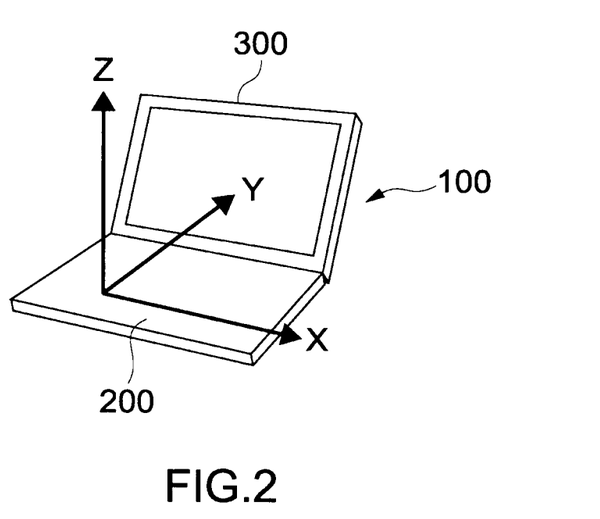
FIG. 2 is a diagram showing a relationship between the information processing apparatus shown in FIG. 1 and triaxial directions.

The triaxial acceleration sensor 4 is a device that detects accelerations in triaxial directions along an X axis, a Y axis, and a Z axis that are orthogonal to one another in the information processing apparatus 100. As shown in FIG. 2, in the information processing apparatus 100 of a laptop type that has a cuboid shape, the X axis is a longitudinal direction of the information processing apparatus 100, the Y axis is a short-side direction of the information processing apparatus 100, and the Z axis is a thickness direction of the information processing apparatus 100.

The EC 5 is a device that performs control related to the keyboard 7, control related to outputs of the triaxial acceleration sensor 4, and the like. More specifically, the EC 5 is an LSI (Large Scale Integration) on which a CPU, a ROM (Read Only Memory), a RAM (Random Access Memory), and the like are mounted. The EC 5 detects a gravity-free state and a movement of the information processing apparatus 100 before a shake/impact of a dangerous level in terms of a protection of the HDD 3 is applied to the information processing apparatus 100 (hereinafter, referred to as "predetermined movement") based on the accelerations in the triaxial directions output from the triaxial acceleration sensor 4, and outputs a head evacuation signal S1 to the HDD 3 so as to activate the HDD protective function of the HDD 3. Specific movements that are referred to as the predetermined movement of the information processing apparatus 100 will be described later.

The HDD 3 is a drive that has a protective function for preventing, by moving a magnetic head from a disk recording area to an evacuation position in response to the head evacuation signal S1, the head and the disk recording surface from coming into contact with each other to break the disk when a shake/impact of a dangerous level in terms of a protection of the HDD 3 is applied to the information processing apparatus 100. The HDD 3 includes a disk as a magnetic recording medium, a disk drive portion including a spindle motor that drives the disk and a drive circuit that drives the spindle motor, a head for magnetically reading/writing signals from/to the disk, and a head actuator that supports the head and moves it in a disk radial direction. Also provided in the HDD 3 are a lamp as a portion that holds the head at a position on an outer circumferential side to which the head evacuates from the disk recording area, an unload terminal to which the head evacuation signal S1 from the EC 5 is input, and a disk controller that controls the HDD 3. When the unload terminal is asserted by the head evacuation signal S1 from the EC 5, for example, the disk controller drives the head actuator to move the head to the outer circumferential side of the disk (unload) and causes the lamp to hold the head at the position to which the head evacuates from the disk recording area.

(Overview of HDD Head Evacuation Processing)

Next, an overview of head evacuation processing carried out by the information processing apparatus 100 of this embodiment will be described.

Figure 3:
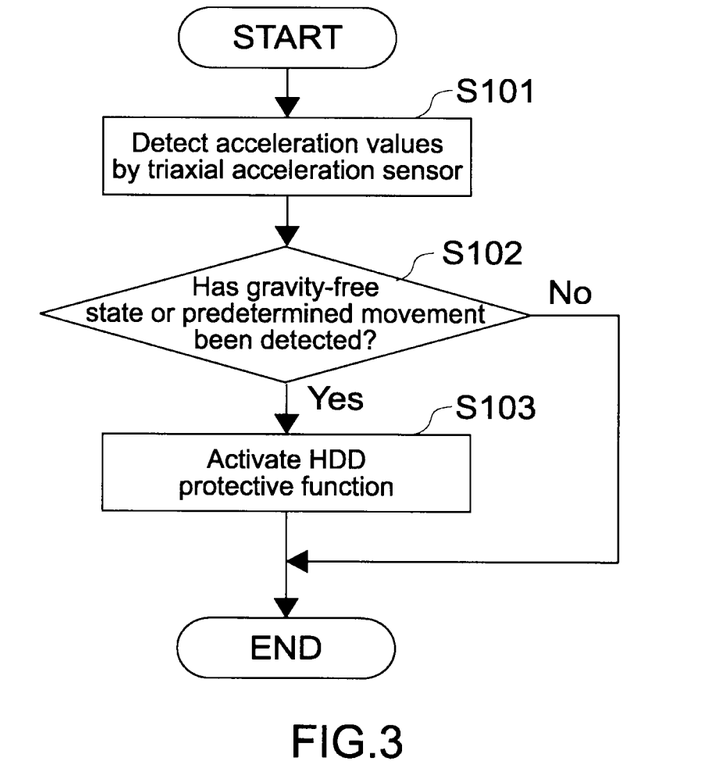
FIG. 3 is a flowchart of head evacuation processing carried out by the information processing apparatus shown in FIG. 1.
Figure 4:
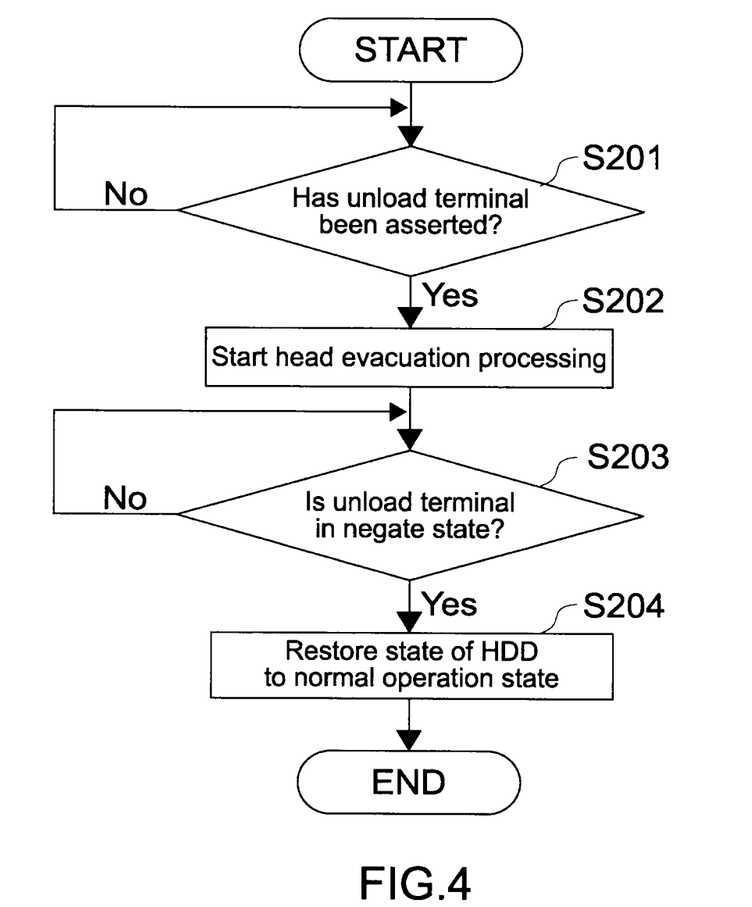
FIG. 4 is a flowchart of an operation of an HDD protective function in an HDD shown in FIG. 1.

FIG. 3 is a flowchart of the head evacuation processing carried out by the information processing apparatus 100 of this embodiment. FIG. 4 is a flowchart of an operation of the protective function in the HDD 3.

The EC 5 repetitively executes the head evacuation processing described below at a certain time cycle. It should be noted that the certain time cycle described above is, for example, about 10 to 20 ms, though the range of the time cycle is not limited thereto. The EC 5 obtains acceleration values in the triaxial directions detected by the triaxial acceleration sensor 4 (Step S101).

Next, the EC 5 makes an attempt to detect either the gravity-free state or the predetermined movement of the information processing apparatus 100 based on the acceleration values in the triaxial directions obtained by the triaxial acceleration sensor 4 (Step S102). Upon detecting either the gravity-free state or the predetermined movement, the EC 5 outputs a head evacuation signal S1 to the HDD 3 so as to activate the HDD protective function (Step S103).

The gravity-free state is detected when a sum of the acceleration values in the triaxial directions is smaller than a predetermined threshold value and such a state lasts for over a predetermined time. Here, the threshold value with respect to the sum of the acceleration values is, for example, about 0.4 G, and the predetermined time is, for example, about 10 ms. It should be noted that those values are mere examples and may be changed as appropriate. A method of detecting the predetermined movement of the information processing apparatus 100 will be described later.

In the flowchart of FIG. 4, the head evacuation signal S1 from the EC 5 is supplied as a signal that asserts the unload terminal provided in the HDD 3. The disk controller monitors the unload terminal. When the unload terminal is asserted (YES in Step S201), the disk controller drives the head actuator to move (unload) the head for causing the lamp provided at the position on the outer circumferential side to which the head evacuates from the disk recording area to hold the head (Step S202). It should be noted that the disk controller may supply a control signal to the disk drive portion after the head is unloaded to thus control the drive of the disk to decelerate as quickly as possible and to eventually stop.

When the supply of the head evacuation signal S1 from the EC 5 to the HDD 3 is ended, the unload terminal of the HDD 3 is put to a negate state which is a state where a command transmission from the CPU 1 to the HDD 3 is allowed. On the other hand, upon being notified that the unload terminal is in the negate state (Step S203), the disk controller of the HDD 3 restores the state to a normal operation state which is, for example, a state where data can be written/read to/from the disk, based on a command from the CPU 1 (Step S204).

Incidentally, the supply time of the head evacuation signal S1 from the EC 5 to the HDD 3 is made to correspond to, for example, a timeout time of a response to the command from the CPU 1 to the HDD 3 (e.g., about 1 sec). It should be noted that since the supply time of the head evacuation signal S1 from the EC 5 to the HDD 3 corresponds to a time during which the head is evacuated, when placing more importance on the protective performance of the HDD 3, it is desirable to select a relatively-long time, and when placing more importance on responsiveness according to a user, it is desirable to select a relatively-short time.

(Head Evacuation Processing Based on Detection of Predetermined Movement of Information Processing Apparatus 100)

Next, a detection of the predetermined movement of the information processing apparatus 100 and head evacuation processing in the head evacuation processing described above will be described.

Figure 5:
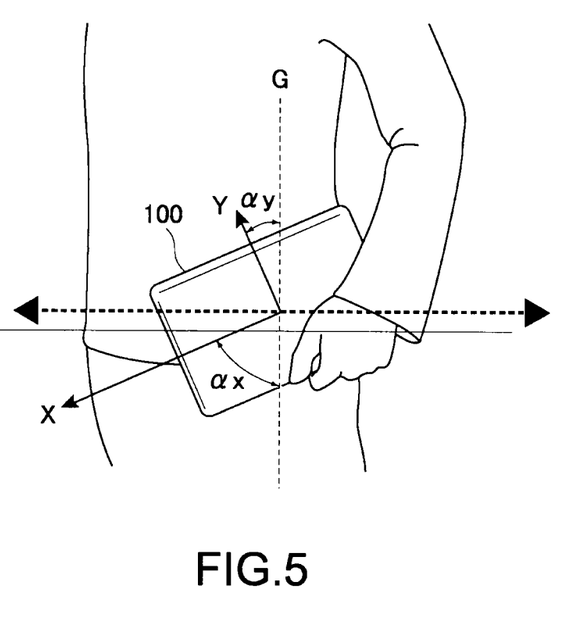
FIG. 5 is a diagram showing a state where a user is carrying the information processing apparatus shown in FIG. 1 in the arm.

FIG. 5 is a diagram showing a state where a user is carrying the information processing apparatus 100 in the arm. Here, an angle formed between a gravity direction G and the X axis of the information processing apparatus 100 is represented by $\alpha x$, and an angle formed between the gravity direction G and the Y axis of the information processing apparatus 100 is represented by $\alpha y$. A position of the information processing apparatus 100 when being carried by the user in the arm is, in most cases, either a "laterally-holding position" with which $\alpha x > \alpha y$ is established as shown in FIG. 5 or a "longitudinally-holding position" with which, conversely, $\alpha x < \alpha y$ is established though not shown in FIG. 5. Such a position of the information processing apparatus 100 can be detected by the EC 5 based on the acceleration values in the triaxial directions obtained by the triaxial acceleration sensor 4.

In this embodiment, an acceleration value in the axial direction vertical to or closest to the direction vertical to the gravity direction G is selected out of the acceleration values in the X- and Y-axis directions obtained by the triaxial acceleration sensor 4, and the predetermined movement of the information processing apparatus 100 is detected based on the selected acceleration value. More specifically, the predetermined movement of the information processing apparatus 100 is detected based on the acceleration value in the X-axis direction when the information processing apparatus 100 is in the laterally-holding position, and the predetermined movement of the information processing apparatus 100 is detected based on the acceleration value in the Y-axis direction when the information processing apparatus 100 is in the longitudinally-holding position.

Moreover, instead of using the combination of the X- and Y-axis directions, it is also possible to judge the axial direction that is vertical to or closest to the direction vertical to the gravity direction G out of the combination of biaxial directions other than the combination of the X- and Y-axis directions among the triaxial directions of the X, Y, and Z axes, and detect the predetermined movement of the information processing apparatus 100 based on the acceleration value in that axial direction.

Here, the "predetermined movement of the information processing apparatus 100 before a shake/impact of a dangerous level in terms of a protection of the HDD 3 is applied to the information processing apparatus 100" refers to, for example, a movement caused at a time the information processing apparatus 100 is about to be placed on a table from a state where it is carried in the arm of the user. At this time, a possibility that the acceleration in the direction vertical to the gravity direction becomes higher than that of the movement caused when the information processing apparatus 100 is being carried in the arm of the user is high. Though the acceleration generated at this instant is not of a level to induce a breakage of the HDD 3, the acceleration generated by a collision between the information processing apparatus 100 and the table right after that is of a dangerous level in terms of a protection of the HDD 3. As a more-specific example, in a case where the information processing apparatus 100 is tossed to the table, there is a fear that a large shake/impact is applied to the information processing apparatus 100 at the time the information processing apparatus 100 collides with the table to thus break the HDD 3.

In this regard, if the fact that a shake/impact of a dangerous level in terms of a protection of the HDD 3 is about to be applied to the information processing apparatus 100 can be detected as early as possible out of the movements of the information processing apparatus 100 before that to thus start the head evacuation processing, the possibility that the head evacuation is ended at a time point the shake/impact is actually applied to the information processing apparatus 100 can be raised, and protective performance of the HDD 3 can be enhanced.

Next, referring to FIG. 6, the operation of the head evacuation processing that is based on a detection result of the predetermined movement of the information processing apparatus 100 as means for solving the problems described above will be described.

First, the EC 5 obtains an acceleration value in the axial direction initially set as a detection target from the triaxial acceleration sensor 4 (Step S301). Here, the axial direction set in the initial setting is the X-axis direction. This is because, since the holding position of the information processing apparatus 100 is, in most cases, the laterally-holding position, the X-axis direction is closest to the direction vertical to the gravity direction G out of the triaxial directions at the laterally-holding position.

The acceleration value in the X-axis direction is represented by Gx. The EC 5 removes a low-frequency component corresponding to a gravity component from the acceleration value Gx in the X-axis direction obtained by the triaxial acceleration sensor 4 (Step S302). The EC 5 removes a frequency component smaller than 1 Hz, for example. The acceleration value in the X-axis direction obtained after the low-frequency component is removed is represented by Gx hpf.

Next, the EC 5 compares the acceleration value Gx hpf in the X-axis direction and a preset threshold value Gth (Step S303). The threshold value Gth is desirably set within a range of 0.3 G to 1 G in view of movements of arms during walking. When the threshold value Gth is smaller than 0.3 G, a possibility that a normal movement during walking is also judged as the movement before a shake/impact of a dangerous level in terms of a protection of the HDD 3 is applied to the information processing apparatus 100 may become high, and an unnecessary head evacuation operation may be executed frequently. It should be noted that an acceleration in a horizontal direction generated by the arm movement during walking is about 0.1 G to 0.3 G, and the threshold value Gth needs to be set higher than that range. On the other hand, when the threshold value Gth exceeds 1 G, there is a possibility that a sensitivity required for detecting the predetermined movement of the information processing apparatus 100 cannot be obtained. In this embodiment, the threshold value Gth is 0.6 G.

Next, the EC 5 measures a time during which the acceleration value Gx hpf exceeds the threshold value Gth and judges whether the measured time has exceeded a predetermined T2 time (Step S304). When the measured time has exceeded the T2 time, the EC 5 supplies a head evacuation signal S1 to the HDD 3 and activates the HDD protective function (Step S305).

It should be noted that the T2 time is desirably set within the range of, for example, 10 ms to 50 ms. When the T2 time is smaller than 10 ms, it may become difficult to make a distinction between the acceleration generated by the movement caused during the process in which the information processing apparatus 100 is placed on a table from a state where it is carried in the arm as shown in FIG. 5 and the acceleration generated by an instantaneous shake/impact due to a collision or the like. As a result, there is a fear that an unnecessary head evacuation operation may be executed frequently. Conversely, if the T2 time is too long, a start timing of the head evacuation operation is delayed, thus affecting reliability of the HDD protective function. In this embodiment, the T2 time is 30 ms.

Next, the EC 5 detects the position of the information processing apparatus 100 based on the acceleration values in the triaxial directions obtained by the triaxial acceleration sensor 4, judges the axial direction to be the acceleration detection target in accordance with the detected position, and sets the acceleration detection target axial direction as the acceleration detection target axial direction to be used for detecting the predetermined movement from next time onward (Step S306).

When judging that the acceleration detection target axial direction is the Y-axis direction, the acceleration value in the Y-axis direction is set as Gy and the acceleration value in the Y-axis direction obtained after a low-frequency component is removed is set as Gy hpf, and the same processing is carried out. At this time, a threshold value that is compared with the acceleration value Gy hpf in the Y-axis direction may be Gth or any other value set for each axial direction. In addition, the T2 time may take a common value in the evaluation of the acceleration values in the triaxial directions or a value set for each axial direction.

Figure 7:
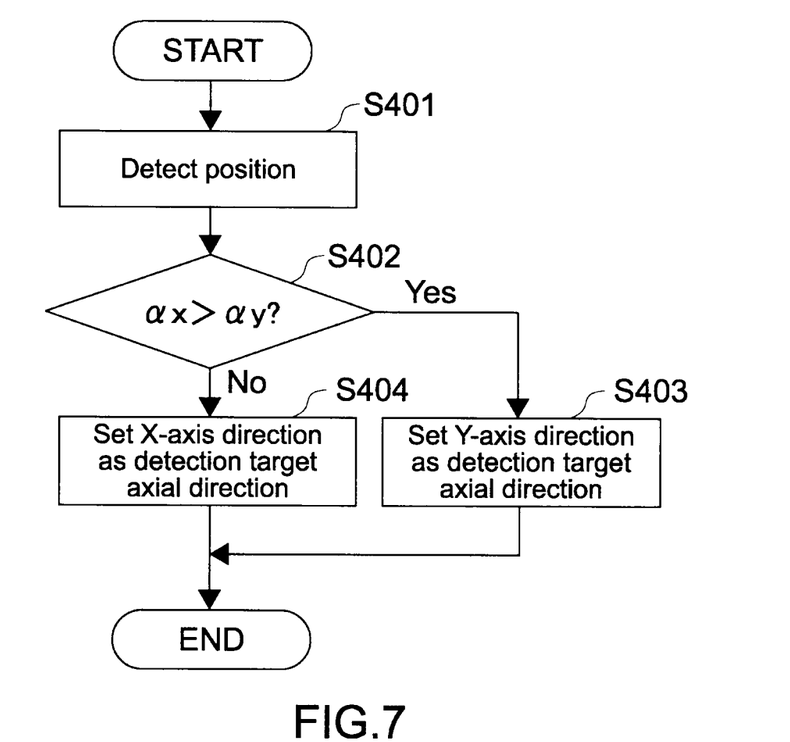
FIG. 7 is a flowchart showing an operation of detecting a position and setting a detection target axial direction in the information processing apparatus shown in FIG. 1.

FIG. 7 is a flowchart showing an operation of Step S306 of detecting the position of the information processing apparatus 100 and setting a detection target axial direction. The EC 5 detects a position of the information processing apparatus 100 with respect to the gravity direction G based on the acceleration values in the X- and Y-axis directions out of the acceleration values in the triaxial directions obtained by the triaxial acceleration sensor 4 (Step S401).

Next, the EC 5 judges which of the tilt αx of the X axis and the tilt αy of the Y axis with respect to the gravity direction G is larger at the detected position of the information processing apparatus 100. If αx>αy is established as in the example of FIG. 5 (YES in Step S402), for example, the EC 5 judges the X-axis direction as the correct acceleration detection target axial direction and stores the X-axis direction as the acceleration detection target axial direction to be used from next time onward (Step S403). Moreover, if αx≤αy is established (NO in Step S402), the EC 5 judges the Y-axis direction as the correct acceleration detection target axial direction and stores the Y-axis direction as the acceleration detection target axial direction to be used from next time onward (Step S404).

Accordingly, from next time onward, the predetermined movement is detected based on the acceleration value in the stored acceleration detection target axial direction.

Figure 8:
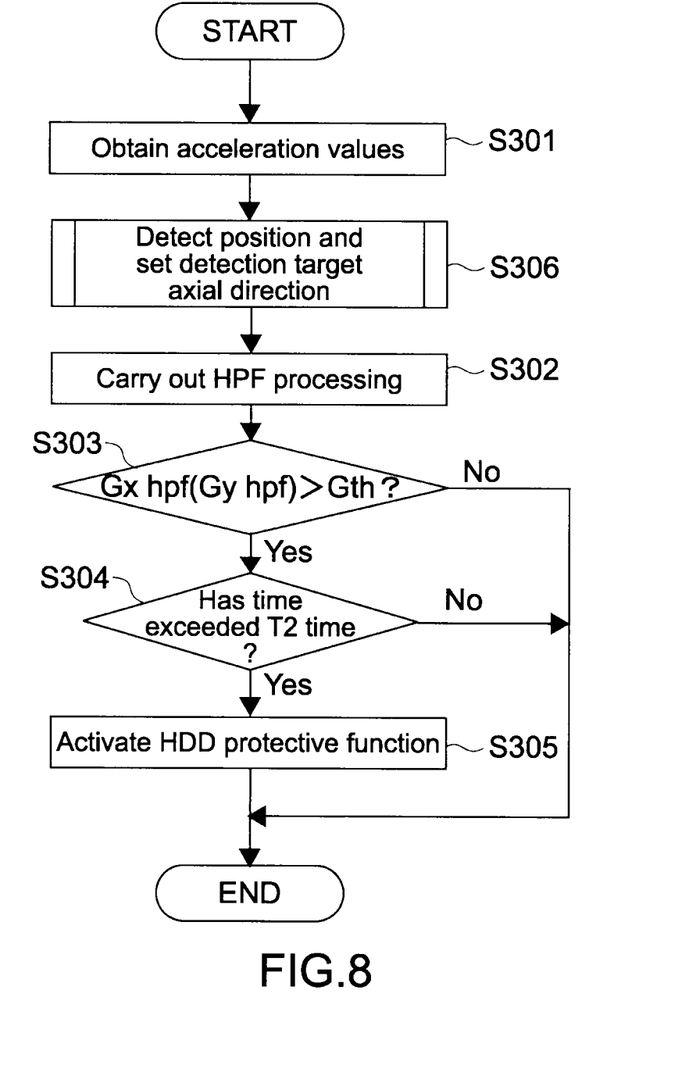
FIG. 8 is a flowchart on a modified example of the head evacuation processing that is based on the detection result of the movement obtained by the information processing apparatus shown in FIG. 1.

Incidentally, the reason why the detection of the position of the information processing apparatus 100 and the setting of the acceleration detection target axial direction are carried out after the first processing of activating the HDD protective function is because the time required from the obtainment of the acceleration value to the start of the head evacuation processing is delayed by an amount of time required for detecting the position and setting the acceleration detection target axial direction. It should be noted that by adopting a CPU with a higher velocity for the EC 5, for example, it becomes possible to change the processing steps so that Step S306 of FIG. 6 of detecting the position and setting the acceleration detection target axial direction is executed right after Step S301 of obtaining the acceleration values by the triaxial acceleration sensor 4 (see FIG. 8). Also in this case, the EC 5 stores a judgment result on the correct acceleration detection target axial direction and stores it as the acceleration detection target axial direction to be used from next time onward. Thus, the predetermined movement is detected based on the acceleration value in the stored acceleration detection target axial direction from next time onward.

As described above, in this embodiment, the EC 5 detects the movement of the information processing apparatus 100 based on the acceleration value in the axial direction closest to the direction vertical to the gravity direction G out of the triaxial directions of the triaxial acceleration sensor 4 and activates the HDD protective function. Accordingly, it becomes possible to suppress an occurrence of an unnecessary head evacuation processing due to an increase of an acceleration in a direction parallel to the gravity direction G at the time the user operates keys while holding the information processing apparatus 100 or the user is walking while carrying the information processing apparatus 100 in the arm.

Further, in this embodiment, the EC 5 is capable of detecting, based on the acceleration value in the axial direction closest to the direction vertical to the gravity direction G out of the triaxial directions of the triaxial acceleration sensor 4, the movement caused at an instant the information processing apparatus 100 is about to be placed on a table from a state where it is carried in the arm of the user, for example, and activating the HDD protective function. Specifically, the EC 5 is capable of detecting a fact that a shake/impact of a dangerous level in terms of a protection of the HDD 3 is about to be applied to the information processing apparatus 100 at an earliest time possible out of the movements of the information processing apparatus 100 before the application, to thus start the head evacuation processing. As a result, it becomes possible to raise the possibility that the head evacuation is ended at a time point a shake/impact of a dangerous level is actually applied to the information processing apparatus 100 and enhance protection performance of the HDD 3.

Furthermore, in this embodiment, the EC 5 detects the position of the information processing apparatus 100 with respect to the gravity direction G based on the output of the triaxial acceleration sensor 4 and sets the axial direction closest to the direction vertical to the gravity direction G as the detection target axial direction based on the detected position. As a result, the movement of the information processing apparatus 100 before a shake/impact of a dangerous level in terms of a protection of the HDD 3 is applied to the information processing apparatus 100 can be favorably detected at both positions, that is, the laterally-holding position and the longitudinally-holding position, of the information processing apparatus 100.

Moreover, in the HDD 3 in this embodiment, when the head evacuation signal S1 is input from the EC 5, the unload of the head is started, and the drive of the disk decelerates as quickly as possible to eventually stop. As a result, a breakage degree of the disk can be suppressed even when the head is too late to evacuate at a timing at which a shake/impact of a dangerous level is applied and the head comes into contact with the data recording surface.

Second Embodiment

Next, a second embodiment of the present invention will be described.

In the first embodiment, the EC 5 detects the predetermined movement of the information processing apparatus 100 based on the acceleration in the axial direction closest to the direction vertical to the gravity direction G out of the triaxial directions of the triaxial acceleration sensor 4. In contrast, in the second embodiment, the EC 5 carries out the head evacuation processing by calculating an acceleration value Gcal as a component in the direction vertical to the gravity direction G based on the acceleration values in the X- and Y-axis directions and detecting the predetermined movement of the information processing apparatus 100 based on the calculated value.

Figure 9:
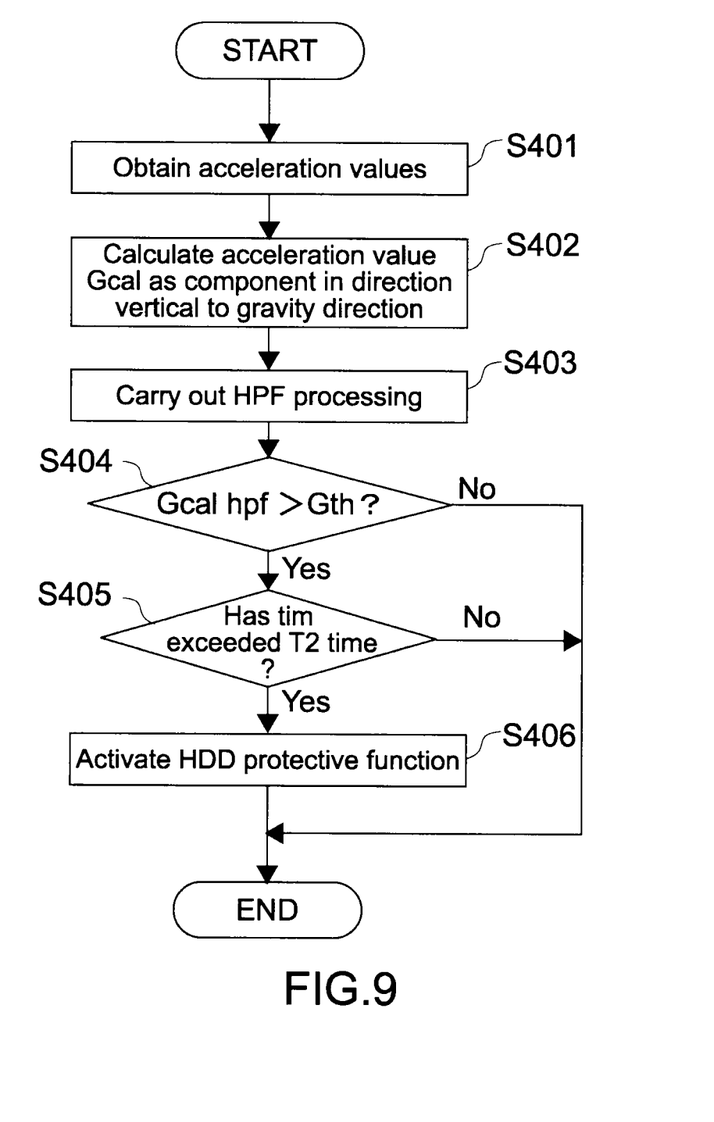
FIG. 9 is a flowchart showing an operation of detecting a position and setting a detection target axial direction in an information processing apparatus according to a second embodiment of the present invention.

FIG. 9 is a flowchart showing a flow in a case where the head evacuation processing is carried out by detecting the predetermined movement of the information processing apparatus 100 based on the acceleration value Gcal.

First, the EC 5 obtains the acceleration values in the X- and Y-axis directions by the triaxial acceleration sensor 4 (Step S401). Next, the EC 5 calculates the acceleration value Gcal as a component in the direction vertical to the gravity direction G based on the acceleration values in the X- and Y-axis directions obtained by the triaxial acceleration sensor 4 (Step S402). The acceleration value Gcal as a component in the vertical direction is calculated by the following method, for example.

$$Gcal = |Gx \sin(\alpha y) - Gy \cos(\alpha y)|$$

Here, Gx represents an acceleration value in the X-axis direction, Gy represents an acceleration value in the Y-axis direction, and αy represents an angle formed between the gravity direction G and the Y axis.

Figure 6:
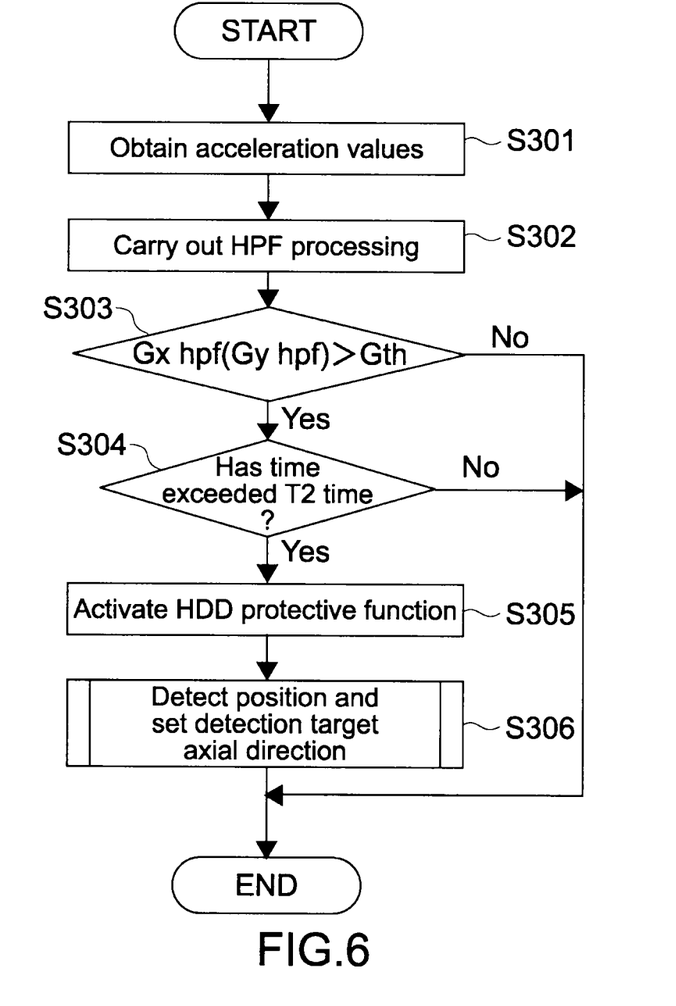
FIG. 6 is a flowchart on the head evacuation processing that is based on a detection result of a movement obtained by the information processing apparatus shown in FIG. 1.

The subsequent operations are the same as those of the first embodiment shown in the flowchart of FIG. 6.

In other words, the EC 5 removes a low-frequency component corresponding to a gravity component from the calculated acceleration value Gcal (Step S403). The EC 5 removes a frequency component smaller than 1 Hz, for example. The acceleration value obtained after the low-frequency component is removed is represented by Gcal hpf.

Next, the EC 5 compares the acceleration value Gcal hpf and a preset threshold value Gth (Step S404). The EC 5 measures a time during which the acceleration value Gcal hpf exceeds the threshold value Gth and judges whether the measured time has exceeded a predetermined T2 time (Step S405). When the measured time has exceeded the T2 time, the EC 5 supplies a head evacuation signal S1 to the HDD 3 and activates the HDD protective function (Step S406).

As described above, according to this embodiment, the EC 5 carries out the head evacuation processing by calculating the acceleration value Gcal as a component in the direction vertical to the gravity direction G out of the acceleration values in the X- and Y-axis directions and detecting the predetermined movement of the information processing apparatus 100 based on the calculated acceleration value Gcal. Accordingly, the movement of the information processing apparatus 100 before a shake/impact of a dangerous level in terms of a protection of the HDD 3 is applied to the information processing apparatus 100 can be detected with high accuracy.

Third Embodiment

Next, a third embodiment of the present invention will be described.

The third embodiment uses a triaxial acceleration sensor that has a built-in controller including a CPU and a main memory. By using the triaxial acceleration sensor having the built-in controller, at least a part of the head evacuation processing based on the acceleration values that has been carried out by the EC 5 in the first and second embodiments can be executed by the built-in controller of the triaxial acceleration sensor.

Figure 10:
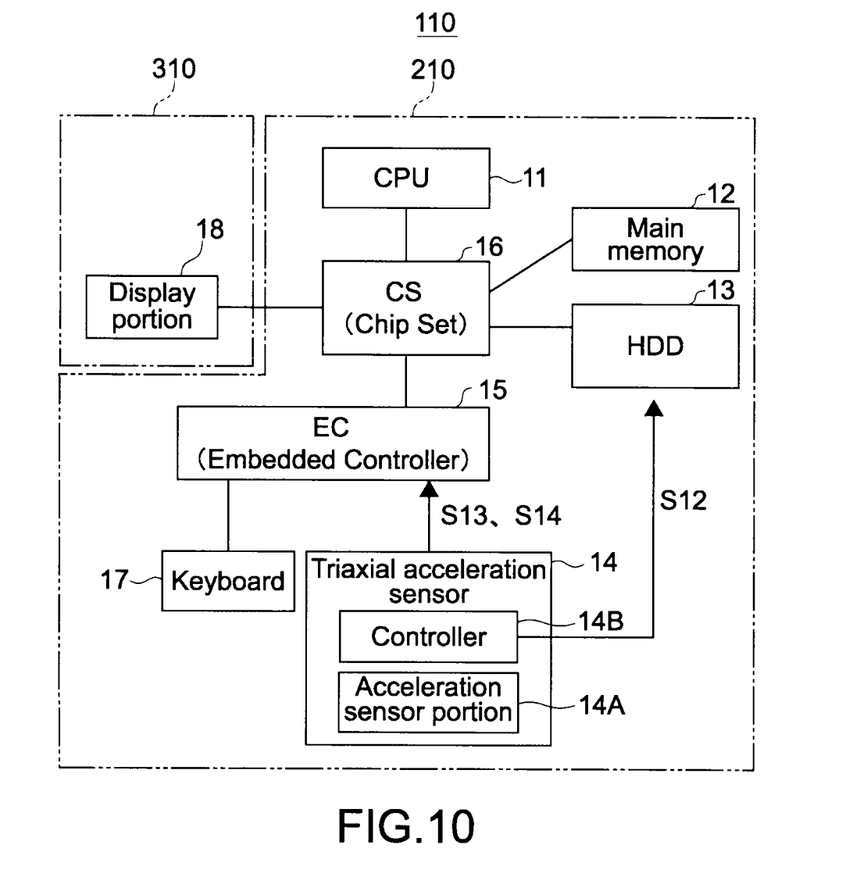
FIG. 10 is a block diagram showing a structure of an information processing apparatus according to a third embodiment of the present invention.

FIG. 10 is a block diagram showing a structure of an information processing apparatus according to the third embodiment of the present invention. It should be noted that in the figure, parts in common with or corresponding to those of FIG. 1 are denoted by the same reference numerals.

In an information processing apparatus 110 of this embodiment, a triaxial acceleration sensor 14 includes an acceleration sensor portion 14A that detects acceleration values in triaxial directions along the X axis, Y axis, and Z axis of the information processing apparatus 110 and a controller 14B that performs control related to the acceleration values in the triaxial directions output from the acceleration sensor portion 14A. The structure of the acceleration sensor portion 14A is functionally the same as that of the triaxial acceleration sensor 4 of the first embodiment. Moreover, an EC 15 is different from the EC 5 of the information processing apparatus 100 shown in FIG. 1 in that the structure for performing control related to the acceleration values in the triaxial directions output from the acceleration sensor portion 14A is removed. Other structures are the same as those of the information processing apparatus 100 shown in FIG. 1.

Figure 11:
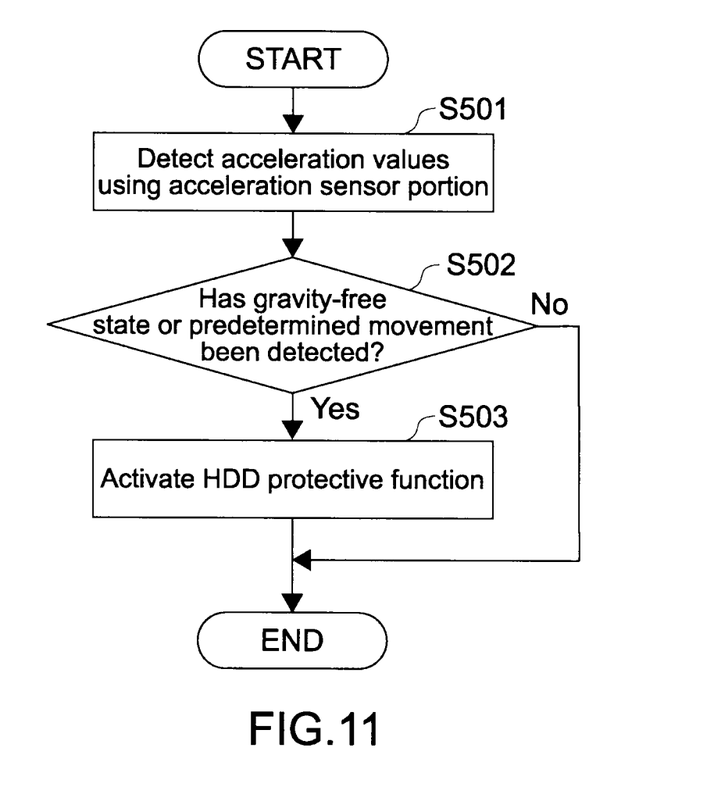
FIG. 11 is a flowchart of head evacuation processing carried out by the information processing apparatus according to the third embodiment of the present invention.

Next, the head evacuation processing carried out by the information processing apparatus 110 of this embodiment will be described with reference to the flowchart of FIG. 11.

The controller 14B in the triaxial acceleration sensor 14 repetitively executes the head evacuation processing described below at a certain time cycle. The controller 14B obtains acceleration values in the triaxial directions detected by the acceleration sensor portion 14A (Step S501). Next, the controller 14B makes an attempt to detect either the gravity-free state or the predetermined movement of the information processing apparatus 110 based on the acceleration values in the triaxial directions obtained by the acceleration sensor portion 14A (Step S502). Here, since a specific detection method of the gravity-free state and a specific detection method of the predetermined movement of the information processing apparatus 110 are the same as those of the first embodiment, descriptions thereof will be omitted. Upon detecting either the gravity-free state or the predetermined movement of the information processing apparatus 110, the controller 14B outputs a head evacuation signal S12 to an HDD 13 so as to activate the HDD protective function (Step S503).

The head evacuation operation in the HDD 13 is the same as that of the first embodiment.

In other words, an unload terminal provided in the HDD 13 is asserted by the head evacuation signal S12 from the controller 14B of the triaxial acceleration sensor 14. The disk controller of the HDD 13 monitors the unload terminal. When the unload terminal is asserted, the disk controller drives the head actuator to move (unload) the head for causing the lamp provided at the position on the outer circumferential side to which the head evacuates from the disk recording area to hold the head. It should be noted that the disk controller may supply a control signal to the disk drive portion after the head is unloaded to thus control the drive of the disk to decelerate as quickly as possible and to eventually stop.

The controller 14B of the triaxial acceleration sensor 14 supplies the head evacuation signal S12 to the HDD 13 only for a certain time. When the supply of the head evacuation signal S12 from the controller 14B is ended, the unload terminal of the HDD 13 is put to a negate state which is a state where a command transmission from the CPU 11 to the HDD 13 is allowed. On the other hand, upon detecting that the unload terminal is in the negate state, the disk controller of the HDD 13 restores the state to a normal operation state which is, for example, a state where data can be written/read to/from the disk, based on a command from the CPU 11.

As described above, it is also possible to use the triaxial acceleration sensor 14 having the built-in controller 14B and carry out the head evacuation processing that is based on the acceleration values in the triaxial directions detected by the acceleration sensor portion 14A in the controller 14B of the triaxial acceleration sensor 14.

The present application contains subject matter related to that disclosed in Japanese Priority Patent Application JP 2010-102034 filed in the Japan Patent Office on Apr. 27, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing apparatus, comprising:
   a hard disk drive that has a protective function for moving
      a head from a recording area of a disk to an evacuation
      position;
   at least one sensor configured to detect accelerations in triaxial directions orthogonal to one another, judge, out of biaxial directions among the triaxial directions, an axial direction closest to a direction vertical to the gravity direction by comparing a first angle formed between a first direction and the gravity direction with a second angle formed between a second direction and the gravity direction, and detect, as a detection target acceleration, accelerations in one of a vertical direction with respect to a gravity direction and the judged axial direction; and circuitry configured to detect a movement of the information processing apparatus based on the acceleration detected as the detection target acceleration and determine whether to activate the protective function of the hard disk drive based on the detected movement.

2. The information processing apparatus according to claim 1, wherein the circuitry sets, regarding the detection target acceleration, that an acceleration larger than a preset value has continued for over a preset time as a condition of the movement for determining whether to activate the protective function.

3. The information processing apparatus according to claim 1, wherein the circuitry detects the acceleration in the vertical direction with respect to the gravity direction based on acceleration values in the triaxial directions being smaller than a predetermined threshold.

4. The information processing apparatus according to claim 3, wherein the circuitry detects the acceleration in the vertical direction with respect to the gravity direction based on a sum of the acceleration values being smaller than a predetermined threshold.

5. The information processing apparatus according to claim 4, wherein the circuitry detects the acceleration in the vertical direction with respect to the gravity direction based on the sum of the acceleration values in the triaxial directions being smaller than a predetermined threshold for a predetermined period of time.

6. The information processing apparatus according to claim 1, wherein the at least one sensor detects, as a detection target acceleration, accelerations in the judged axial direction.

7. The information processing apparatus according to claim 1, wherein
the triaxial directions include the X-axis, Y-axis and Z-axis, and
the circuitry judges the axial direction closest to a direction vertical to the gravity direction by comparing the first angle formed between the X-axis and the gravity direction with the second angle formed between the Y-axis and the gravity direction.

8. The information processing apparatus according to claim 1, wherein the biaxial directions are predetermined biaxial directions among the triaxial directions.

9. The information processing apparatus according to claim 8, further comprising:
a memory configured to store a result of the judgment on the axial direction as an axial direction in which an acceleration is to be detected at least as a next detection target acceleration,
wherein the circuitry detects, regarding the axial direction stored by the memory, the movement based on the acceleration detected by the at least one sensor.

10. The information processing apparatus according to claim 9,
wherein the hard disk drive includes the disk and a disk drive portion for driving the disk, and
wherein the circuitry outputs a control signal for putting a brake on the disk drive portion after activating the protective function.

11. The information processing apparatus according to claim 2, wherein the at least one sensor detects
accelerations in triaxial directions orthogonal to one another, and
an acceleration component vertical to the gravity direction out of the biaxial directions among the triaxial directions as the detection target acceleration.

12. The information processing apparatus according to claim 11, wherein the biaxial directions are predetermined biaxial directions among the triaxial directions.

13. A head evacuation processing method for an information processing apparatus having a built-in hard disk drive that has a protective function for moving a head from a recording area of a disk to an evacuation position, the head evacuation processing method comprising:
detecting, at a least one sensor, accelerations in triaxial directions orthogonal to one another;
judging, at the at least one sensor and out of biaxial directions among the triaxial directions, an axial direction closest to a direction vertical to the gravity direction by comparing a first angle formed between a first direction and the gravity direction with a second angle formed between a second direction and the gravity direction, and
detecting, as a detection target acceleration, accelerations in one of a vertical direction with respect to a gravity direction;
detecting a movement of the information processing apparatus based on the acceleration detected as the detection target acceleration; and
determining, via a processor, whether to activate the protective function of the hard disk drive based on the detected movement.

14. A non-transitory computer-readable medium storing computer readable instructions thereon which when executed by a computer cause the computer to perform a head evacuation processing method for an information processing apparatus having a built-in hard disk drive that has a protective function for moving a head from a recording area of a disk to an evacuation position, the head evacuation processing method comprising:
detecting accelerations in triaxial directions orthogonal to one another;
judging, out of biaxial directions among the triaxial directions, an axial direction closest to a direction vertical to the gravity direction by comparing a first angle formed between a first direction and the gravity direction with a second angle formed between a second direction and the gravity direction, and
detecting, as a detection target acceleration, accelerations in one of a vertical direction with respect to a gravity direction;
detecting a movement of the information processing apparatus based on the acceleration detected as the detection target acceleration; and
determining whether to activate the protective function of the hard disk drive based on the detected movement.

* * * * *